Dec. 17, 1963 A. GABOR 3,114,899

HIGH DENSITY RECORDING AND PLAY-BACK SYSTEM WITH PREAMBLE AND POSTLUDE PATTERNS

Filed March 17, 1961 2 Sheets-Sheet 1

INVENTOR.

ANDREW GABOR

BY Alfred W. Barber

ATTORNEY

INVENTOR.
ANDREW GABOR
BY Alfred W. Barber
ATTORNEY

United States Patent Office 3,114,899
Patented Dec. 17, 1963

3,114,899
HIGH DENSITY RECORDING AND PLAY-BACK SYSTEM WITH PREAMBLE AND POSTLUDE PATTERNS

Andrew Gabor, Port Washington, N.Y., assignor to Potter Instrument Company, Inc., Plainview, N.Y., a corporation of New York Filed Mar. 17, 1961, Ser. No. 96,550
5 Claims. (Cl. 340—174.1)

The present invention concerns digital recording and, in particular, preamble and postlude patterns for contiguous recording patterns.

The application for Letters Patent in the United States of Andrew Gabor entitled "High Density Recording System," filed May 3, 1960 and bearing Serial Number 26,538 describes a system of recording in which digital information made up of characters represented by one of two possible "bits" is recorded in predetermined contiguous patterns. Each bit occupies one cell time, one being characterized by a reversal of state in the recording medium at the cell boundary only, and the other by a reversal of state in the recording medium at the cell boundary and a reversal of state at a predetermined point within the cell. Since each bit or information cell contains a reversal of recording medium state, the recording may be termed "self-clocking" since clock signals may be recovered and used for timing purposes without the use of a separate clock track.

From the above it can be seen that information and clock pulses are, in effect, recorded in the same track on the recording medium. Provision is made in the read amplifier for separating the clock and information pulses or transitions in such a manner that the two may never be confused. In the steady state condition a gate signal is employed to achieve this end. This gate signal is generated by each clock pulse and is used to inhibit the following information pulse for the duration of the clock output. The same gate signal, when applied to another gate, will inhibit clock pulses and pass information pulses for the duration of the information output. The separation of information pulses from clock pulses is a chain operation that proceeds from clock pulse to clock pulse. Thus, once the process is initiated in the proper phase, it can carry on indefinitely, provided that there is no gap or any disturbance in the flow of pulses.

The problem of placing the read amplifier in proper phase, that is, having the gate signal initially triggered by clock rather than by information pulses, must be surmounted. The danger of confusing clock and information pulses only exists where "ones" are recorded since "zero" is represented by the absence of a pulse in the information phase. A convenient method of achieving initial synchronization is to record data in blocks and to begin each block with the writing of a string of "zeros." Although this method insures that reading will start and continue in the proper phase, the ending of this introduction is not well enough defined to differentiate legitimate information that begins with one or more "zeros." The first data digit could be confused thus with the last of the introductory "zeros." The end of the introduction must, therefore, be marked in some manner. By terminating the introductory string of "zeros" with a "one" the first information data, whether it be the presence or absence of a pulse, will not be lost or ambiguous. This string of zeros terminated by a "one" at the beginning of a block is designated the "preamble" and must be recorded at the beginning of each block. If reading in the reverse direction is desired, the preamble must be recorded at the end of the block as a postlude. The preamble and postlude signals may be generated in the write logic, programmed externally as ordinary data or in any other suitable manner. When a block of information signals is to be recorded, a block marker signal is initiated to start the preamble running. This block marker may be generated as part of the write program. Upon completion of the preamble, the write logic emits a pulse that is designated as request for information, i.e. information representing signals may now be accepted for recording. Data pulses into the write logic must follow these requests by a time lag that is short enough to insure that they are available at the next information phase.

In reading digital information recordings which have been recorded with the above described preamble, both clock and data signals from the read amplifier are gated through AND circuits which are inhibited in the quiescent state. When preamble pulse start to appear, an integrator is caused to build up. This build up after a predetermined time enables an AND circuit so that the first "one" to appear (the "one" which terminates the preamble) can set a flip-flop after a predetermined time delay. The flip-flop in turn enambles two output AND circuits permitting both clock and data signals to appear at the output. The duration of the time delay is set to determine whether the output starts with a clock pulse or a data pulse. At the end of the information data block, the "one" of the postlude is encountered. This particular "one" is made identifyable by the fact that it exists simultaneously in all parallel channels (the code "all ones" is excluded from the data recording). The exlusion of "all ones" may be readily accomplished by choosing the correct parity system. Since this postlude "one" is to be recognized simultaneously in all channels, its presence is sought at the output of the deskewing buffer. Upon detection of the "all ones" condition, the outputs of the deskewing buffer are inhibited so that they will not appear in the output. A signal in response to the detection of "all ones" condition may be used to restore the read amplifier flip-flop, to clear the storage flip-flops and to reset the deskewing buffer. In this manner the system is restored to the quiescent state at the end of a block of signals and is made ready to read the next block. A deskewing buffer suitable for use in conjunction with the present invention has been described by Andrew Gabor in his application for Letters Patent entitled "Parallel Data Skew Correction System" filed Feb. 21, 1961 and bearing Serial Number 91,441.

Accordingly, one object of the present invention is to provide methods of and means for establishing synchronism in the reading equipment for reading digital recordings of the contiguous high density double reversal self-clocking type.

Another object is to provide a preamble and postlude for such recording which may be utilized to control certain reading system functions.

A further object is to provide a distinctive preamble and postlude in such recordings.

A still further object is to proceed and close blocked digital recorded signals with preamble and postlude signals respectively.

These and other objects of the present invention will be apparent from the detailed description of the invention given in the specification in connection with the various figures of the drawing.

Figure 1:
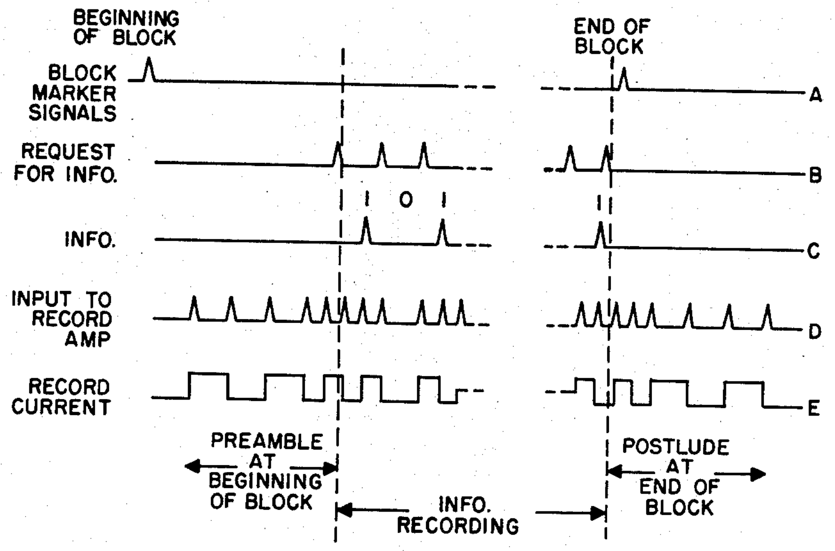
FIGURE 1 is a series of signal representations illustrating the operation of the present invention.

FIG. 1 shows the block marker signals on line A where the beginning of block signal is a pulse preceeding the block recording period by a time equal to the preamble time and the end of block signal is placed immediately after the end of the block recording period. On line B are shown the request for information signals which are pulses spaced by an amount equal to one bit cell time and advanced in phase by a small fixed amount sufficient for the request signal to travel to the information source and for the information bit pulse, if any, to return. Line C shows typical information pulses where a "1" is represented by a pulse within a cell time and a "0" is represented by the absence of a pulse within the cell time. Line D shows the preamble pulses applied to the system in advance of the information block and consisting of a series of "zeros" and a final "one" indicating the end of the preamble. Line D also shows the postlude which starts with a "one" and ends with a series of "zeros." Line E shows the actual recording current generated in response to the pulses shown in line D.

Figure 2:
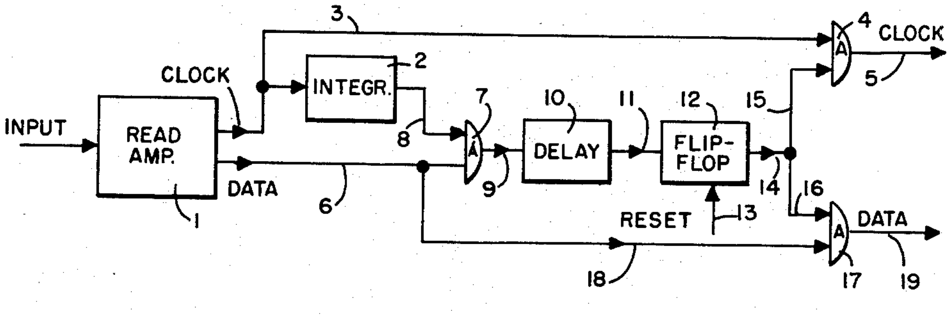
FIGURE 2 is a block diagram of the novel parts of a circuit for utilizing the preamble of the present invention.

FIG. 2 shows a block diagram of one way in which the preamble may be detected. The method of recording the preamble will be described in connection with FIG. 3 and here at FIG. 2 it will be assumed that the preamble has been recorded. The signals picked up by a play-back head from magnetic tape or other suitable recording medium, not shown, are applied as input to the read amplifier 1 which may be taken to include suitable amplifying and shaping circuits to provide clock and data pulses in response to the signals picked up by the play-back head. The clock pulses are applied over line 3 to an AND gate 4 which is closed and does not pass these clock signals until opened by a second signal on line 15. These clock signals are also applied to an integrator 2 which integrates these clock signals at a predetermined rate and provides an output after a predetermined number of clock signals have been received over line 8 to AND gate 7. Thus integrator 2 is designed to provide an output near the end of the preamble time so that the first "one" from data line 6 which is actually the end of preamble signal passes through AND gate 7, over line 9 to delay unit 10 providing a fractional cell time delay to actuate flip-flop 12 over line 11 which in turn applies signals to AND gates 4 and 17 allowing clock signals to flow out over line 5 and data signals from line 6 over line 18 to flow out over line 19. These signals being permitted by the "one" at the end of the preamble will be the data and clock signals of a block of data to be passed on to some further utilization means, not shown.

Figure 3:
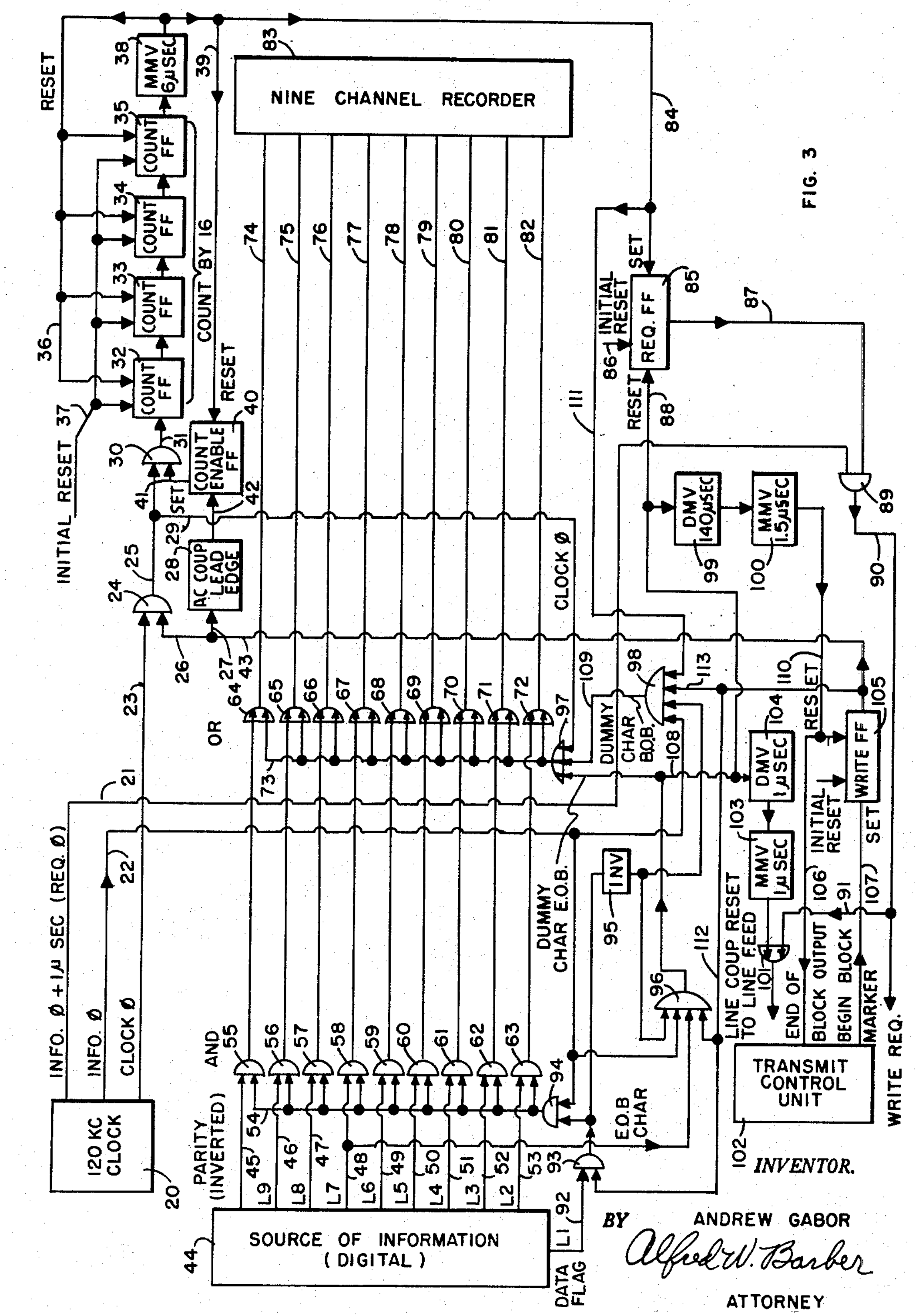
FIGURE 3 is a block diagram of the novel parts of a circuit for providing the preamble and postlude according to the present invention in a digital recording system.

FIG. 3 shows, in block diagram form, one way in which the preamble may be generated for utilization in accordance with the present invention. Clock 20, operating at 120 kilocycles provides three outputs at this base frequency but phased for three different functions. One phase provided over line 21 is equal to the information phase plus one microsecond to provide a phase suitable for a request for information clock. The second phase over line 22 may be termed the information phase and is used to control the information signal gates. The third phase over line 23 may be termed the clock phase and is applied to AND gate 24 to be eventually utilized in generating the preamble. Signals gated through AND gate 24 pass over line 25 to AND gate 30 and also over line 29 to AND gate 97 to be utilized as clock signals in the recording signal. AND gate 30 receiving a clock signal over line 25 and a counter enable signal from the counter enable flip-flop 40 over line 41 provides signals to the counter consisting of flip-flops 32, 33, 34 and 35 over line 31. These flip-flops comprise a four stage binary counter since they are connected in cascade and will fill at a count of 16 providing a pulse to mono-stable multivibrator 38 which is designed to have a 6 microsecond delay in passing its output to line 84 to eventually provide the "one" indicating the end of the preamble. The clock pulses actuating the counter are also actuating the recording circuits as will be set in more detail below so that the preamble is provided by these 16 clock pulses (zeros) and a final "one." An initial reset to the counter may be provided over line 37 while operational resetting is provided over line 36.

Going now to the source of data 44 which may be taken to represent any suitable source of multiple channel digital information in this case providing eight channels of data, an inverted parity signal and data flag. These channels are passed over lines 46, 47, 48, 49, 50, 51, 52, 53, 45 and 92 respectively and are connected to AND gates 56, 57, 58, 59, 60, 61, 62, 63, 55 and 93 respectively. The second input to these AND gates except for 93 is supplied from the output of AND gate 94 over line 54 as parallel input. The outputs of these AND gates except 93 are applied to OR gates 65, 66, 67, 68, 69, 70, 71, 72 and 64 respectively, and will consist in the data or information signals to be recorded. The clock signals are applied to these OR gates in parallel over line 73 from AND gate 97. The outputs of these OR gates consisting in the combined information and clock signals to actuate a digital recorder are fed over lines 75, 76, 77, 78, 79, 80, 81, 82 and 74 respectively to a suitable nine channel parallel recorder 83.

Transmission is controlled from a transmit control unit 102 which when actuated initiates the beginning of block marker over line 107 and end of block marker over line 106 (see FIG. 1, line A). The beginning of block marker signal is applied to write flip-flop 105 which supplies the second enabling signal to AND gate 24 over lines 43 and 26 to start the preamble count as set forth above. This signal is also applied to A.C. coupler 28 over line 27 which supplies a leading edge pulse over line 42 to set the count enable flip-flop 40 and which in turn supplies an enabling signal to AND gate 30 over line 41 to complete the preamble count starting circuit. When the count has reached 16, flip-flop 35 will reset and the resulting pulse is applied to mono-stable multivibrator 38 generating a 6 microsecond pulse ending between the information phase time and the next phase time. The decay side of this pulse provides a pulse for resetting enable flip-flop 40 over line 39 so that no more pulses will be fed to the counter. This 6 microsecond pulse also sets request for data flip-flop 85 over line 84 and this enables AND gate 89 over line 87. With AND gate 89 enabled, the request for data phase clock pulses over line 21 will provide an output over line 90 which may be utilized as a request for data. This 6 microsecond pulse will also pass over line 111 as one of four enable signals to AND gate 98. A second enable signal to AND gate 98 is derived from inverter 95 which receives a "zero" from AND gate 93 since no data flag is present on line 92 and gate 93 is enabled from flip-flop 105 over line 112. The third enable comes from flip-flop 105 over line 113 so that with three enables the information phrase pulses from clock 20 by way of line 22 will pass to output line 109 and through OR gate 97 to place a pulse on line 73 and hence an information phase signal or a "one" on all nine parallel recorder input lines. This forms the preamble "one" on all channels as described above.

The setting of flip-flop 85 also places an enable signal on AND gate 89 over line 87 and the request for data phase clock pulses over line 21 will provide a write signal or data request signal over line 90. The answer to this request for data signal, if data is available, will be a data flag signal on line 92 to AND gate 93. This data flag signal will pass AND gate 93, since it has been enabled by the output of flip-flop 105 over line 112, to AND gate 94 to enable it. With AND gate 94 enabled information phase pulses from clock 20 over line 22 will pass to line 54 enabling AND gates 55 through 63. When these last gates are enabled, data (information) signals from source 44 will be passed to OR gates 64 through 72 and over leads 74 through 82 to the parallel channel recorder 83 to be recorded. The clock signals to be recorded pass through AND gate 24 over line 29 and through OR gate 97 to all channels over lead 73 and through OR gates 64 through 72. This process continues providing information and clock pulses to the recorder until no more information is available and no data flag pulse is received on line 92. However, a final end of block signal or character is provided on one line, in this case on line 48 which is applied as E.O.B. character to AND gate 96. Gate 96 is enabled over four lines. First over line 22 by an information phase pulse from clock 20; second from inverter 95 providing a signal when no data flag signal is received; third from flip-flop 105; and fourth and finally by the end of block character just described so that its output to OR gate 97 places this dummy character on line 73 and hence to all recording channels through OR gates 64 through 72. (All parallel "ones.") This is the "one" which starts the postlude signal. This end of block signal is also used to reset flip-flop 85 over line 88 so that no more request for information signals are sent out. It is also applied to delay multivibrator 99 which delays it 140 microseconds or the time of 16 signal cells during which time 16 "zeros" will be sent to the recorder (clock phase signals only) and recorded to complete the postlude pattern. At the end of 140 microseconds a delay of 1.5 microseconds in mono-stable multivibrator 100 and a signal over line 110 resets write-flip-flop 105 and signaling end of block over line 106. Since OR gate 101, delay multivibrator 104 and mono-stable multivibrator 103 are used for a special function not important to the present invention, their functions will not be described. With write flip-flop 105 reset the entire system returns to its initial condition and is ready to repeat the block cycle just described. The initial resets at various points such as 86 and 37 may be utilized to reset the system initially in any convenient manner automatically or manually so that it is assured that the system is ready for operation.

It will be seen that the postlude pattern is the mirror image of the preamble so that the recorded information may be played back in either direction while utilizing the function of the preamble.

While only one form of the present invention has been shown and described, many modifications will be apparent to those skilled in the art and within the spirit and scope of the invention as set forth in particular in the appended claims.

What is claimed is:

1. A data processing system for processing information and clock pulses in a combined form, comprising a source of clock pulses at a predetermined frequency, said source including three output connections to provide signals at different phase relations relative to each other, a first AND gate including circuit means to pass a first output from said source, delay circuit means connected to provide a predetermined signal output responsive to the first AND gate after an interval of time substantially equal to a preselected length for a preamble to an information block, output circuit means to provide combined information and clock signals, means to connect the output of the first AND gate to the output circuit means, a source of multiple channel digital information including an inverted parity signal and a data presence flag signal, a plurality of AND gates having circuit means to connect each of the information channels to the output circuit means responsive to the data presence flag signal and a second of the outputs from said source of clock pulses, a separate transmit control circuit means to enable the first AND gate and to connect the data presence flag signal to the output circuit means, a second AND gate including circuit means to pass a third of the outputs from said source of clock pulses responsive to said delay circuit means for providing a request-for-data signal, a circuit means for developing a predetermined signal on each channel indicative of an end-of-preamble signal including a third AND gate responsive to said delay circuit means and said separate transmit control circuit means and said data presence flag signal and said record of the outputs from said source of clock pulses, circuit means to provide a postlude beginning with an end-of-block signal connected to the output circuit means from a fourth AND gate responsive to said second of the outputs from said source and clock pulses and said data presence flag signal and said separate transmit control circuit means and to a predetermined one of said multiple channels, and means including a connection from said circuit means for developing a predetermined signal on each channel to remove the enable signal from said second AND gate so that no further request-for-data signal is developed.

2. A data processing system as set forth in claim 1 wherein the preamble to the information block includes a series of "zeros" followed by a "one."

3. A data processing system as set forth in claim 1 wherein the postlude to the information block includes a "one" followed by a series of "zeros."

4. A data processing system as set forth in claim 1 wherein the preamble to the information block includes a series of "zeros" followed by a "one," and the postlude includes signals in substantially a mirror image of said preamble.

5. A data processing system as set forth in claim 1 wherein said output circuit means includes gate circuit means and separate output means, and signal measuring means to control the gate circuit means so that clock-representing signals are connected to one of the separate output means and information-representing signals are connected to the other output means.

References Cited in the file of this patent

UNITED STATES PATENTS

| | | |
|---|---|---|
| 2,892,022 | Houghton | June 23, 1959 |
| 2,907,005 | Chien | Sept. 29, 1959 |
| 2,951,232 | Amdahl | Aug. 30, 1960 |
| 2,972,735 | Fuller | Feb. 21, 1961 |